United States Patent [19]

Hirano et al.

[11] Patent Number: 5,678,069
[45] Date of Patent: Oct. 14, 1997

[54] MOTION COMPENSATION DEVICE CAPABLE OF PERFORMING MOTION COMPENSATION IN A SELECTED DIRECTION

[75] Inventors: Shinichi Hirano, Tokyo; Nobuhiko Terui, Ichikawa, both of Japan

[73] Assignee: Nikon Corporation, Tokyo, Japan

[21] Appl. No.: 503,210

[22] Filed: Jul. 17, 1995

[30] Foreign Application Priority Data

Aug. 1, 1994 [JP] Japan .................................. 6-180253

[51] Int. Cl.$^6$ ........................................... G03B 7/08
[52] U.S. Cl. ................................ 396/55; 348/208
[58] Field of Search .......................... 354/70, 202, 430; 348/208; 396/52, 53, 55; 359/554

[56] References Cited

U.S. PATENT DOCUMENTS 5,220,375  6/1993  Ishida et al. ............... 354/430 X
5,444,512  8/1995  Morizumi ................... 354/430

*Primary Examiner*—Safet Metjahic
*Assistant Examiner*—J. K. Han

[57] ABSTRACT

A motion compensation device for a photographic optical system having a motion compensation control axis selection unit to select an axis direction in which motion compensation control is conducted. The motion compensation device includes a photographic optical system, a motion compensation optical system, a motion detection device to detect movement of the optical axis of the photographic optical system causing image blurring, a motion compensation drive to shift the motion compensation optical system and an imaging surface relative to each other in a direction approximately perpendicular to the optical axis, and a motion compensation control unit to generate a motion compensation control signal for the motion compensation drive based on the output of the motion detection device. The control axis selection unit includes a control axis selection switch which selects a control axis for which motion compensation control is to be conducted, and the motion compensation control unit controls the motion compensation drive based on the control axis selected by the control axis selection switch. The motion compensation device allows a photograph having a blurred effect to be taken, such as by panning in a direction in which motion compensation control is not set.

10 Claims, 7 Drawing Sheets

MOTION COMPENSATION DEVICE CAPABLE OF PERFORMING MOTION COMPENSATION IN A SELECTED DIRECTION

BACKGROUND OF THE INVENTION

1. Field of the Invention

The present invention relates to a motion compensation device to compensate for movement imparted to an optical system to suppress or reduce blurring of an image projected onto an image plane by the optical system, and more particularly, the present invention relates to a motion compensation device that allows an operator to set a direction in which motion compensation is to be performed.

2. Description of the Related Art

Photographic devices, such as cameras, are known which include as standard features both an autofocus (AF) device and a motion compensation device to compensate for motion of a photographic optical system. A motion compensation device is a device which compensates for motion imparted to an optical system to suppress or reduce blurring of an image projected onto an image plane by the optical system. Motion is typically imparted to the optical system in the form of vibratory movement of the optical system caused by hand tremor of a person holding a device employing the optical system. In general, conventional motion compensation devices cause a motion compensation lens to shift counter to the motion of the optical system so as to shift the image projected by the optical system relative to the optical system. Conventional cameras use a motion compensation device to suppress image blur resulting from motion of the camera typically caused by hand tremors of the photographer. A motion compensation apparatus is disclosed, for example, in Japanese Laid-Open Patent publication Hei 2-66535, which discloses a motion compensation device for a single lens optical system. Another example of a motion compensation apparatus is disclosed in Japanese Laid-Open Patent publication Hei 2-183217, which discloses a motion compensation apparatus which compensates for vibration by shifting a portion of a photographic optical system of an internal focusing telescopic lens.

In operation of a photographic device having the above-described type of motion compensation device, when panning is performed the main subject is immobilized and the background image is blurred in the direction of panning. Therefore, when panning is performed, there is a possibility that motion compensation will be conducted for the blurred background. In this case, it is possible to completely stop the motion compensation operation. However, when panning is conducted, the photographic device is moved, and therefore there is a possibility that image blur will be generated in the non-panned directions.

SUMMARY OF THE INVENTION

Accordingly, it is an object of the present invention to provide a motion compensation device that allows setting of a direction in which motion compensation is performed.

It is another object of the present invention to provide a motion compensation device for a photographic optical system that makes it possible to take a photograph with a blur effect, which may be obtained, for example, by setting the direction of motion compensation control in a panned direction and panning in a direction that the motion compensation control is not set.

Objects and advantages of the present invention are achieved with a motion compensation device comprising a photographic optical system, a motion compensation optical system, a motion detection device to detect movement of the optical axis of the photographic optical system causing image blurring, a motion compensation drive to shift the motion compensation optical system and an imaging surface relative to each other in a direction approximately perpendicular to the optical axis, and a motion compensation control unit to generate a motion compensation control signal for the motion compensation drive based on the output of the motion detection device.

The motion compensation drive includes a device for shifting the motion compensation optical system in an X-axis direction in a plane approximately perpendicular to the optical axis, and a device for shifting the motion compensation optical system in a Y-axis direction in a plane approximately perpendicular to the optical axis. By appropriately controlling the shifting of the motion compensation optical system in the X-axis and Y-axis directions, the motion compensation optical system may be shifted in a plane approximately perpendicular to the optical axis in any direction.

The motion compensation device also includes a control axis selection unit to select an axis along which motion compensation control is performed. The motion compensation control unit controls the motion compensation drive based on the control axis selected by the control axis selection unit. The control axis selection unit includes a control axis switch which is set in a horizontal direction when motion compensation control in the X-axis direction is selected, is set in the vertical direction when motion compensation control in the Y-axis direction is selected, and is set at a 45 degree angle when both X- and Y-axis control is selected. The direction of the selection switch to select the control axis corresponds to the direction of the selected control axis.

In accordance with embodiments of the present invention, motion compensation control is performed in individual directions in relation to the optical axis of the photographic optical system. Therefore, when motion compensation control is performed in a set direction (e.g., X-axis or Y-axis direction) and motion compensation control in the non-set direction is not conducted, it is possible to conduct motion compensation control in a non-panned direction and to inhibit motion compensation control in the direction of the pan.

Further, in accordance with embodiments of the present invention, the direction of the motion compensation control is easily selected by the control axis selection unit. Still further, in accordance with embodiments of the present invention, because the direction of the control axis selection switch and the selected control axis are identical, the selected direction for the motion compensation control can be easily determined regardless of whether the photographic device is held vertically or horizontally.

BRIEF DESCRIPTION OF THE DRAWINGS

Objects and advantages of the present invention will become apparent and more readily appreciated from the following description of the preferred embodiments taken in conjunction with the accompanying drawings of which.

DESCRIPTION OF THE PREFERRED EMBODIMENTS

Figure 1:
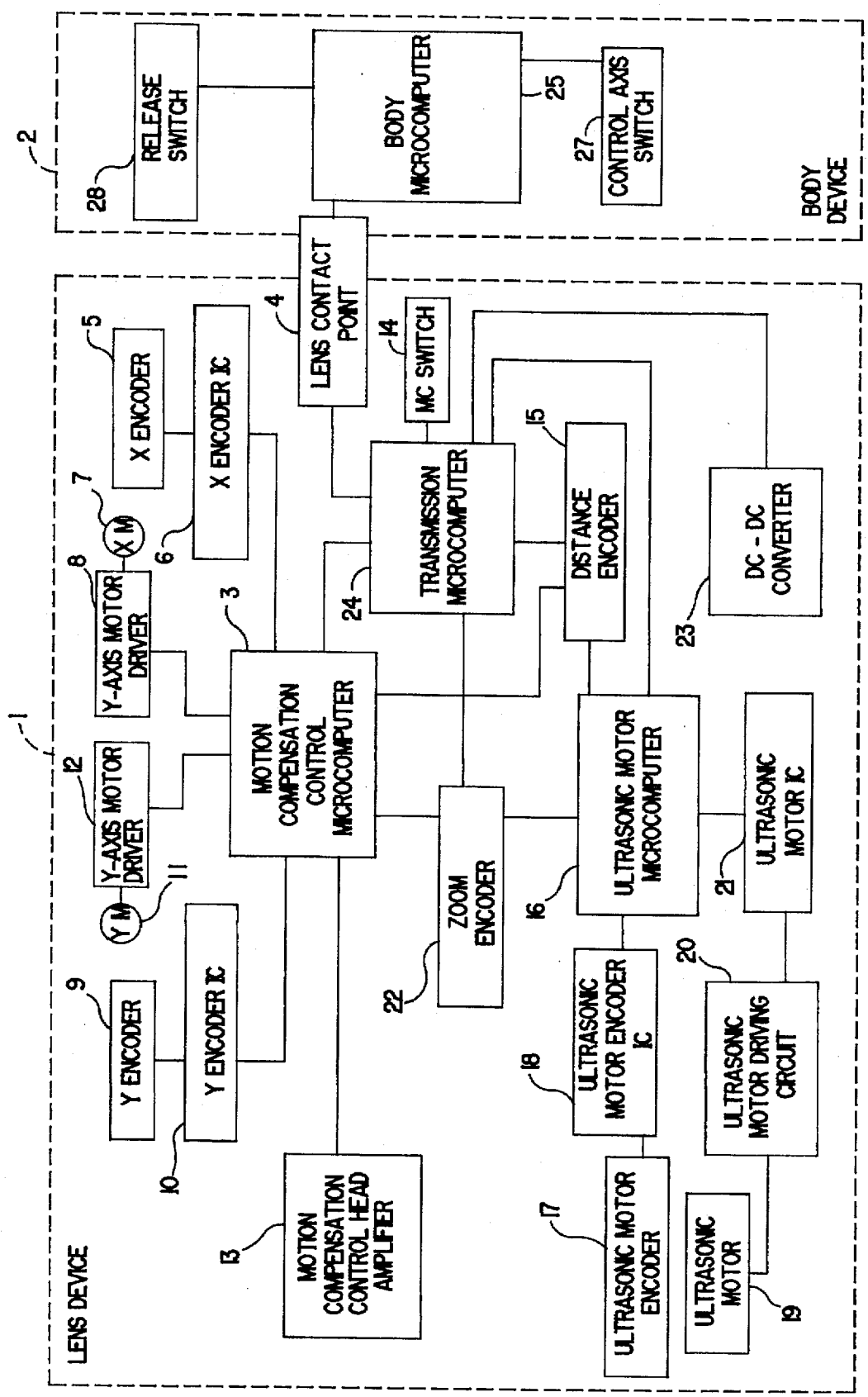
FIG. 1 it is a block diagram of a photographic device having a motion compensation device in accordance with embodiments of the present invention.

Reference will now be made in detail to the present preferred embodiments of the present invention, examples of which are illustrated in the accompanying drawings, wherein like reference numerals refer to like elements throughout.

Figure 7:
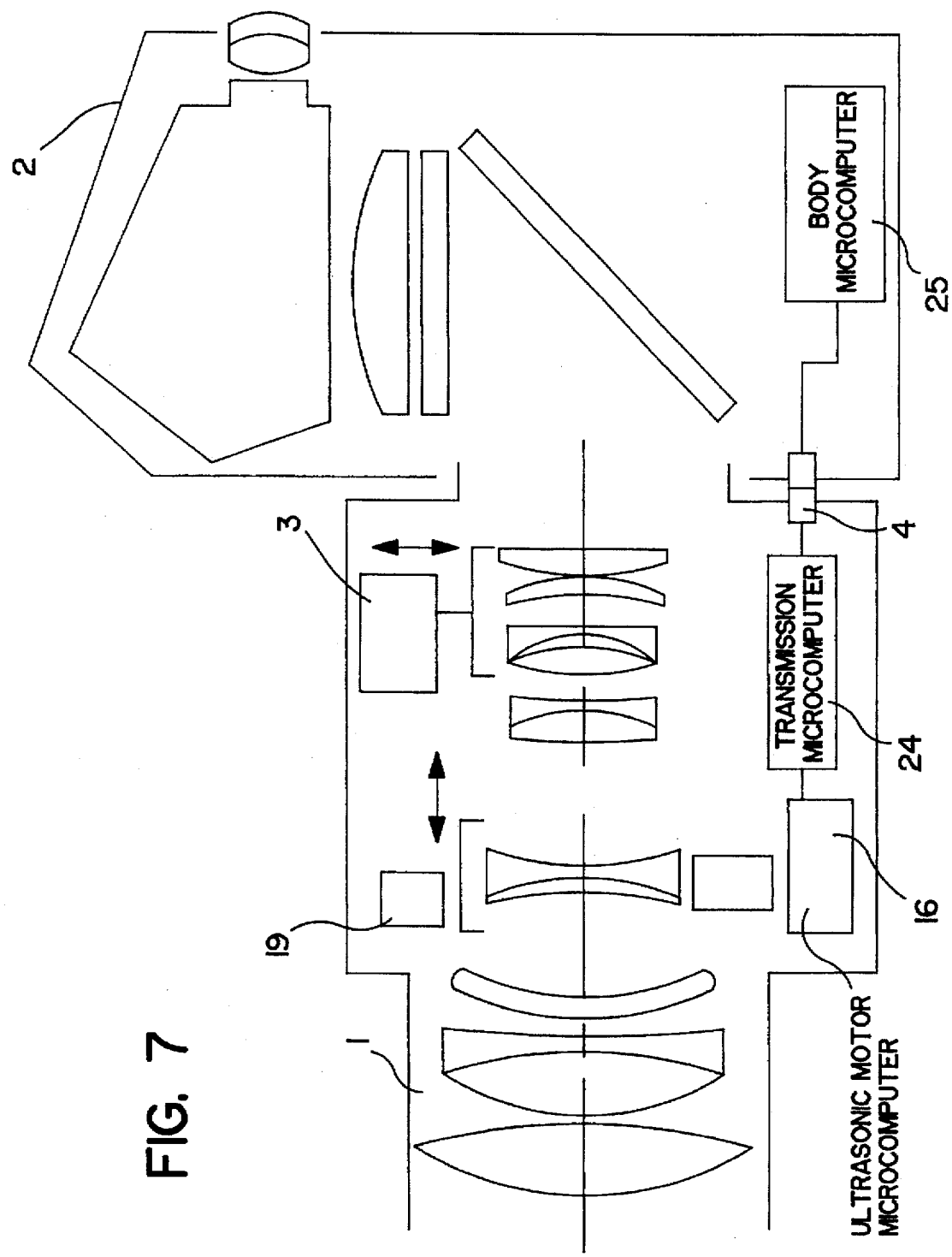
FIG. 7 shows the structure of the motion compensation device including a photographic optical system in accordance with embodiments of the present invention.

A photographic device having a motion compensation device in accordance with embodiments of the present invention will now be described with reference to FIGS. 1 and 7. In accordance with the preferred embodiments, the photographic device may be a camera, such as a single lens reflex camera, or other type of camera or imaging device.

FIG. 1 is a block diagram of a photographic device having a motion compensation device in accordance with embodiments of the present invention. FIG. 7 is a side view of a photographic device including a photographic optical system located within the photographic device in accordance with embodiments of the present invention. As shown in FIGS. 1 and 7, the photographic device is comprised of a lens device 1 and a body device 2. The lens device 1 includes a motion compensation control microcomputer 3, an ultrasonic motor (USM) microcomputer 16 and a communications microcomputer 24. The body device 2 includes a body microcomputer 25.

A lens contact point 4 represents the electrical points of contact that are used for transmitting signals between the body device 2 and the photographic lens device 1. The lens contact point 4 connects the communications microcomputer 24 and the body microcomputer 25.

As shown in FIG. 1, the motion compensation control microcomputer 3 controls a motion compensation drive, comprising an X-axis motor 7, an X-axis motor driver 8, a Y-axis motor 11 and a Y-axis motor driver 12, based on optical system position data received from the body microcomputer 25 in the body device 2 and data received from each of four encoders, X-encoder 5, Y-encoder 9, distance encoder 15 and zoom encoder 22.

The X-encoder 5 detects an amount of movement of the optical system in an X-axis direction and outputs the detected amount of movement to an X-encoder integrated circuit (IC) 6. The X-encoder IC 6 converts the detected amount of movement of the optical system in the X-axis direction to an electrical signal representing the detected amount of movement, and this signal is sent to the motion compensation control microcomputer 3. The motion compensation control microcomputer 3 sends a signal to the X-axis motor driver 8 which drives the X-axis motor 7 to shift the motion compensation optical system in the X-axis direction.

In a similar manner, the Y-encoder 9 detects an amount of movement of the optical system in the Y-axis direction and outputs the detected amount of movement to a Y-encoder IC 10. The Y-encoder IC 10 converts the detected amount of movement of the optical system in the Y-axis direction to an electrical signal representing the detected amount of movement, and this signal is sent to the motion compensation control microcomputer 3. The motion compensation control microcomputer 3 sends a signal to the Y-axis motor driver 12 which drives the Y-axis motor 11 to shift the motion compensation optical system in the Y-axis direction.

By appropriately moving the motion compensation optical system in the X-axis and Y-axis directions with the X-axis motion compensation drive and the Y-axis motion compensation drive, respectively, the motion compensation optical system can be shifted approximately perpendicular to the optical axis in all directions.

A motion compensation head amplifier 13 detects an amount of motion and converts the detected motion information to an electrical signal representing the detected amount of motion. The electrical signal representing the detected amount of motion is then sent to the motion compensation control microcomputer 3. The motion compensation head amplifier 13 may be, for example, an angular velocity sensor.

A motion compensation (MC) switch 14 switches the motion compensation drive ON or OFF, and also switches between two motion compensation modes, referred to hereinafter as mode 1 and mode 2. For example, motion compensation mode 1 is a coarse control mode in which coarse control is conducted for compensating for motion causing blurring of the viewfinder image after photographic preparatory action has started. Motion compensation mode 2 is a fine control mode in which precise control to compensate for motion causing blurring is conducted during exposure.

The distance encoder 15 detects a focusing position and converts the detected focusing position to an electrical signal representing the detected focusing position. The output of the distance encoder 15 is connected to the motion compensation control microcomputer 3, the ultrasonic microcomputer 16, and the transmission microcomputer 24.

The ultrasonic motor microcomputer 16 controls the ultrasonic motor 19 which drives the focusing optical system. An ultrasonic motor encoder 17 detects an amount of movement of the ultrasonic motor 19 and the output of ultrasonic motor encoder 17 is sent to an ultrasonic motor encoder IC 18. The ultrasonic motor encoder IC 18 converts the amount of movement of the ultrasonic motor 19 to an electrical signal representing the amount of movement of ultrasonic motor 19, and this electrical signal is sent to the ultrasonic motor microcomputer 16.

An ultrasonic motor driving circuit 20 has a drive frequency specific to the ultrasonic motor 19, and generates two drive signals that are 90° out of phase with each other. An ultrasonic motor IC 21 interfaces the ultrasonic motor microcomputer 16 with the ultrasonic motor 19 and the ultrasonic motor driving circuit 20.

The zoom encoder 22 detects the lens focus distance and converts the detected lens focus distance to an electrical signal representing the detected lens focus distance. The output of the zoom encoder 22 is connected to the motion compensation control microcomputer 3, the ultrasonic motor microcomputer 16, and the transmission microcomputer 24.

A DC-DC converter 23 provides a stable DC voltage even when there are changes in the battery voltage. The DC-DC converter 23 is controlled by a signal from transmission microcomputer 24.

The transmission microcomputer 24 transmits signals from the lens device 1 to the body device 2, and transmits commands to the motion compensation control microcomputer 3 and the ultrasonic motor microcomputer 16 in the lens device 1.

Figure 8:
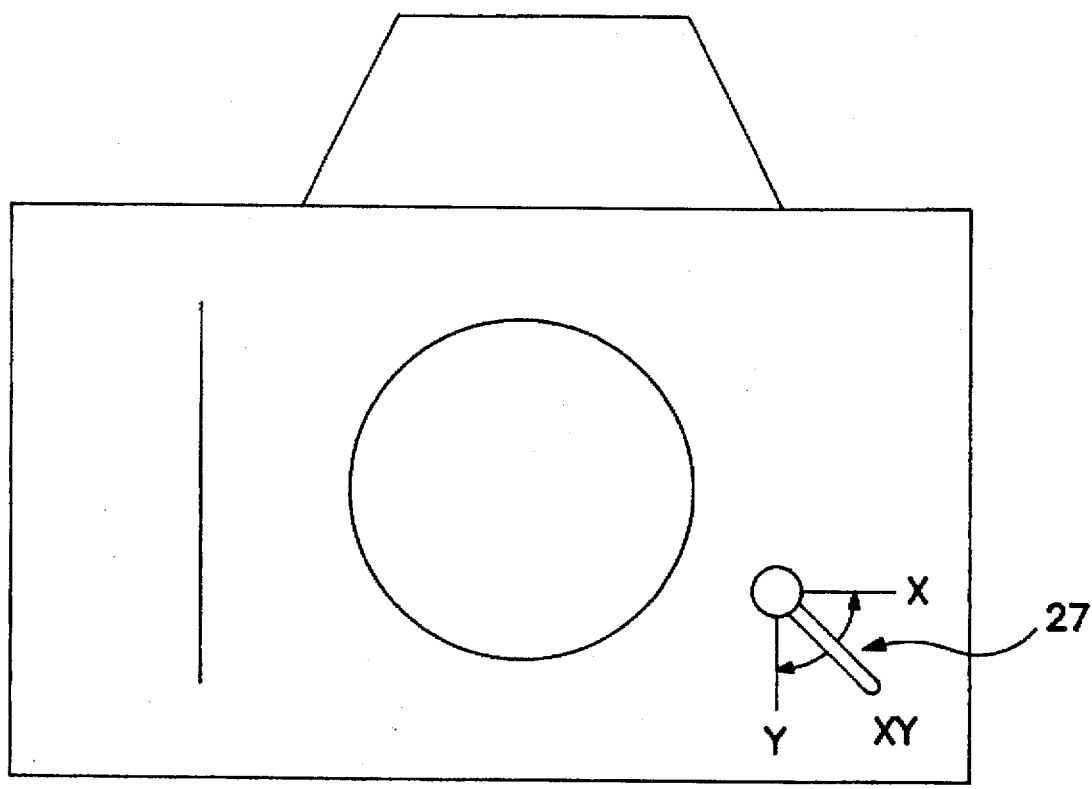
FIG. 8 shows a photographic device having a control axis selection switch of the motion compensation apparatus in accordance with embodiments of the present invention.

The body device 2 includes a control axis switch 27 which selects a motion compensation control axis. As shown in FIG. 8, when motion compensation control is to be conducted only in the X-axis direction, the control axis switch 27 is set in the horizontal direction (X-axis position). When motion compensation control is to be conducted only in the Y-axis direction, the control axis switch 27 is set in the vertical direction (Y-axis position). For motion compensation control in both the X- and Y-axis directions, the control axis switch is set at a 45 degree angle (XY position). Thus, the lever of the control axis switch 27 is set in a direction identical to the axis direction in which motion compensation control is performed. Therefore, regardless of how the photographic device is held (vertical or horizontal position), the motion compensation control axis direction is clearly indicated by the direction of the control axis switch 27.

The body device 2 also includes a release switch 28 comprised of a half-depression switch SW1 which starts a photographic preparatory action when the release button is half-pressed, and a full-depression switch SW2 which provides a signal indicating the start of exposure control when the release button is fully pressed.

Figure 2:
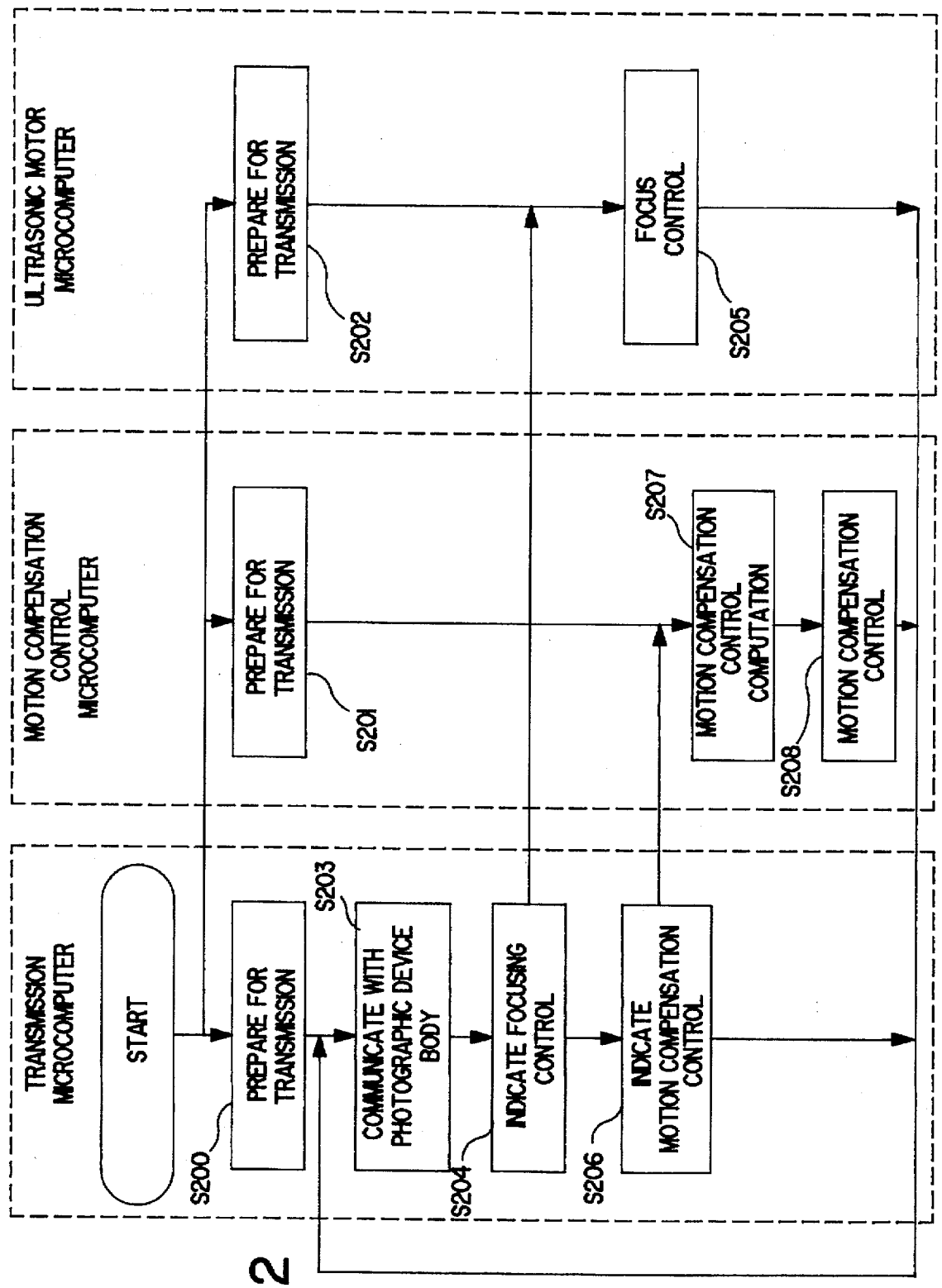
FIG. 2 is a flow chart showing an operational process for performing photography with a device having a motion compensation device in accordance with embodiments of the present invention.

FIG. 2 is a flow chart showing an operational process for performing a photographic process in accordance with embodiments of the present invention.

In FIG. 2, the steps of the operational process which are respectively performed by the transmission microcomputer 24, the motion compensation control microcomputer 3 and the ultrasonic motor microcomputer 16 are enclosed within dashed boxes.

Beginning in step S200, transmission microcomputer 24 prepares for transmission. At the same time that transmission microcomputer 24 is preparing for transmission, the motion compensation control microcomputer 3 prepares for transmission (step S201 ), and the ultrasonic motor microcomputer 16 prepares for transmission (step S202). The communication microcomputer 24 then communicates (step S203) with the photographic device body 2 via the lens contact point 4 to receive focusing control information and motion compensation control information. Next, the focusing control information received from the photographic device body 2 is transmitted (step S204) to the ultrasonic motor microcomputer 16. The ultrasonic motor microcomputer 16 conducts focusing control (step S205) based on the information from the zoom encoder 22 and the distance encoder 15.

Continuing, in step S206, the motion compensation control information that is communicated from the photographic device body 2 is transmitted to the motion compensation control microcomputer 3. The motion compensation control microcomputer 3 performs a motion compensation control computation (step S207) and the motion compensation control microcomputer 3 performs motion compensation control (step S208).

Figure 3:
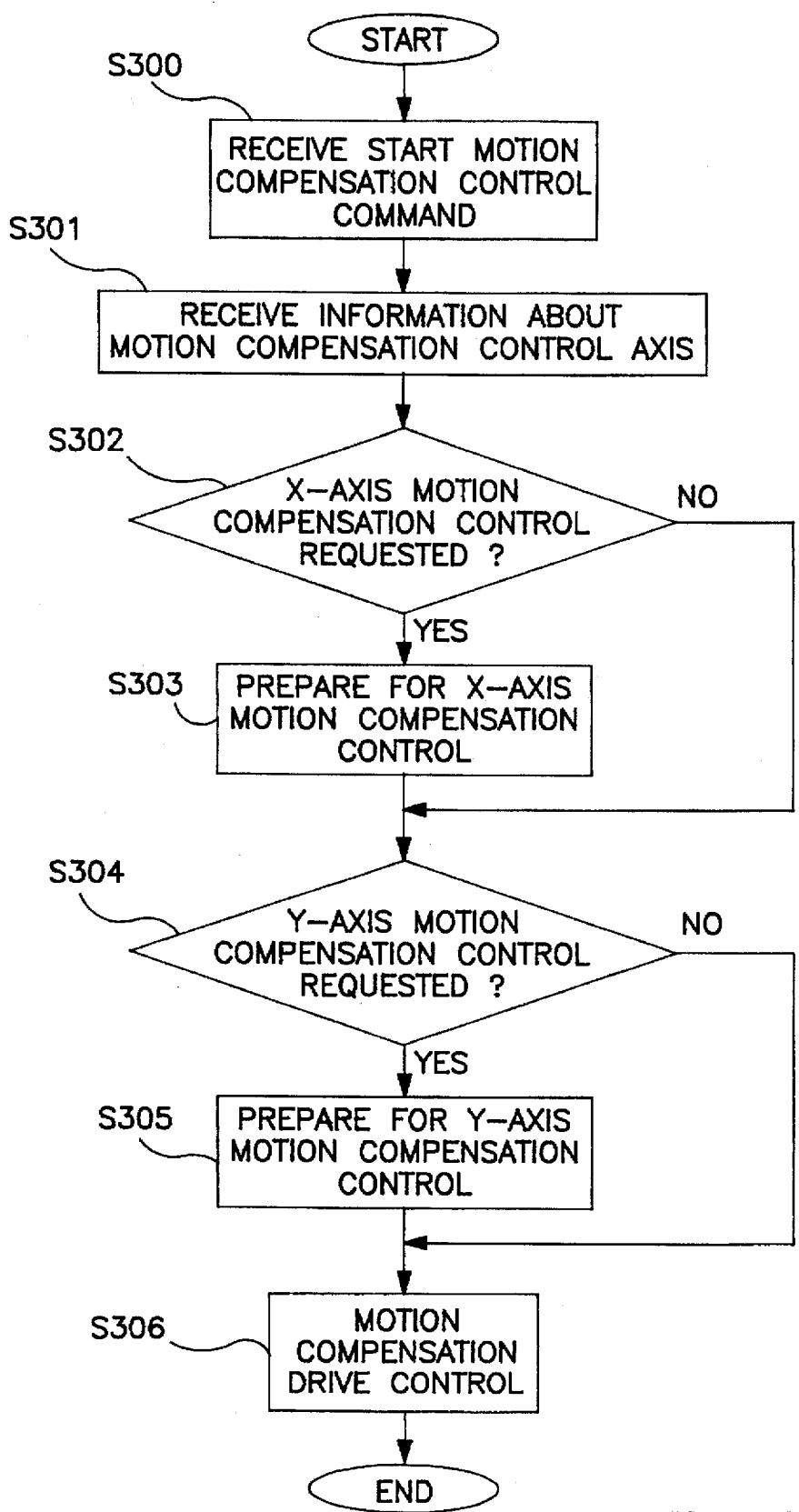
FIG. 3 is a flow chart showing an operational process for the motion compensation control computation performed in step S208 in FIG. 2.

FIG. 3 is a flow chart showing an operational process for performing the motion compensation control of step S208 in FIG. 2. At the start of the operational process shown in FIG. 3, motion compensation control microcomputer 3 receives (step S300) a start motion compensation control command from transmission microcomputer 24. The motion compensation control microcomputer 3 then receives (step S301) information about the selected motion compensation control axis from the transmission microcomputer 24.

At step S302, the motion compensation control microcomputer 3 judges whether X-axis motion compensation control is requested. When X-axis motion compensation control is requested, the operational process continues in step S303. When X-axis motion compensation control is not requested, the operational process continues in step S304. At step S303, motion compensation control microcomputer 3 prepares for X-axis motion compensation control.

In step S304, the motion compensation control microcomputer 3 judges whether Y-axis motion compensation control is requested. When Y-axis motion compensation control is requested, the operational process continues in step S305. When Y-axis motion compensation control is not requested, the operational process continues in step S306. At step S305, the motion compensation control microcomputer 3 prepares for Y-axis motion compensation control. At step S306, motion compensation control microcomputer 3 starts motion compensation drive control.

Figure 4:
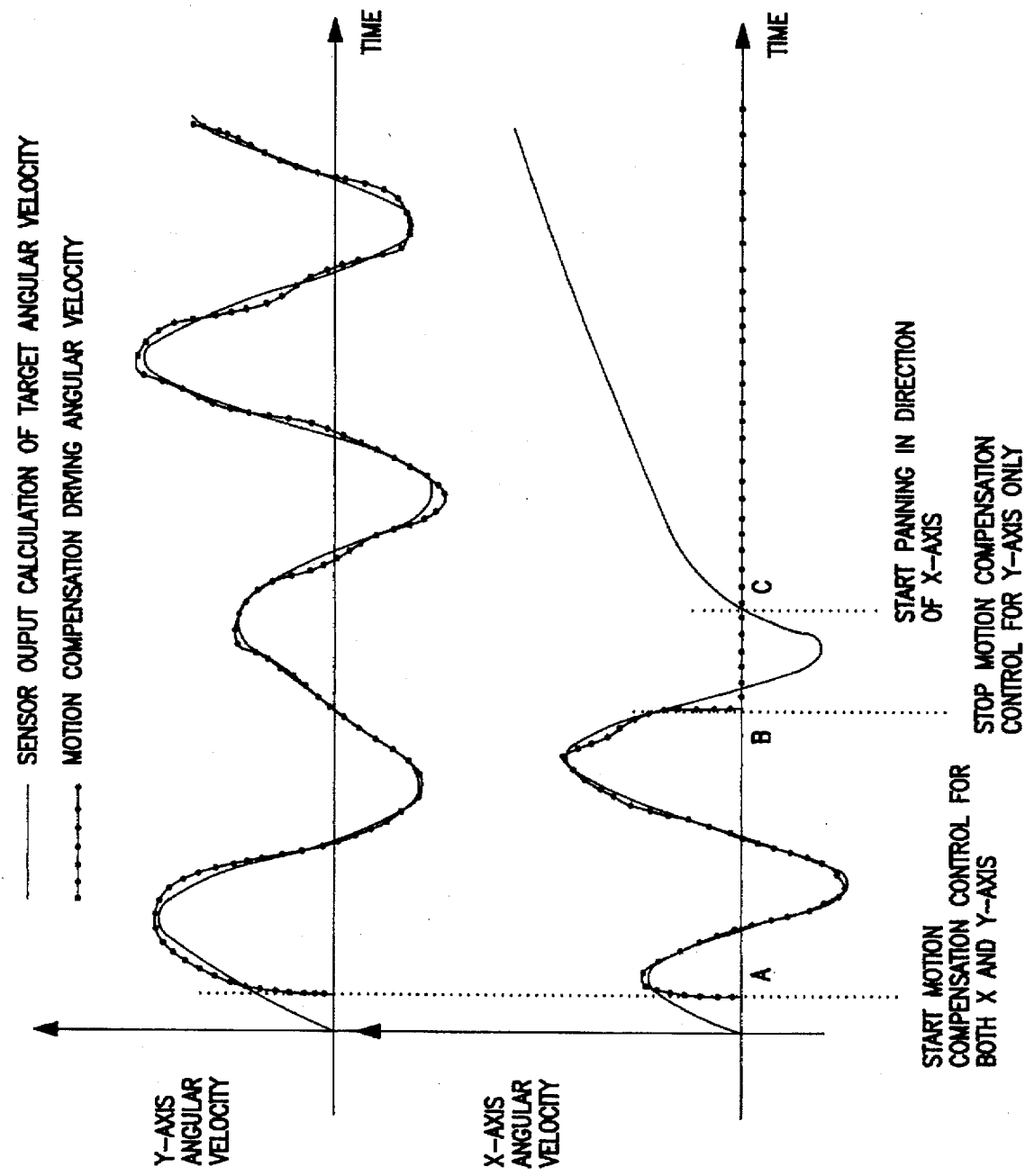
FIG. 4 is a graph showing the relationship between a target angular velocity and the actual driven motion compensation optical system angular velocity for the motion compensation device in accordance with embodiments of the present invention.

FIG. 4 shows a relationship between a target angular velocity that is calculated from the output waveform of the motion detection device (angular velocity detection sensor) of the motion compensation device and the actual driven angular velocity of the motion compensation optical system, in both the horizontal direction (X-axis) and the vertical direction (Y-axis) relative to the optical axis. At point A, transmission microcomputer 24 receives from the body device 2 a start motion compensation control command and motion compensation control axis information indicating that both the X-axis and Y-axis motion compensation control are in effect. Motion compensation drive control is started for both the X and Y axes.

Figure 5:
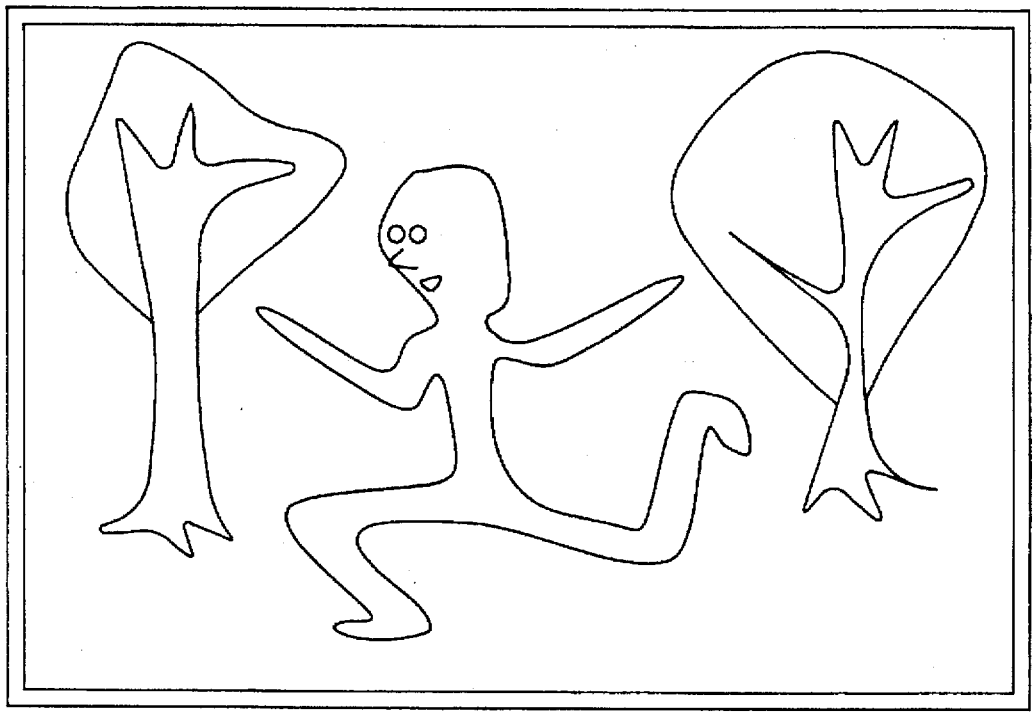
FIG. 5. is an example of a photograph taken with the motion compensation device in which motion compensation control was performed for both the X- and Y-axes in accordance with embodiments of the present invention.

FIG. 5 shows an example of a photograph in which panning was conducted in the horizontal direction relative to the optical axis, during which motion compensation control was conducted for both the X and Y axes.

At point B, transmission microcomputer 24 receives from the body device 2 a stop motion compensation command and motion compensation control axis information indicating that only the Y-axis motion compensation control is in effect. Motion compensation drive control is stopped for the X-axis. At point C, it is assumed that panning in the direction of the X-axis is started. In this case, the motion compensation drive control is only in the direction of the Y-axis. Therefore, a photograph taken under these conditions shows the effect of motion compensation conducted in the Y-axis direction and a blur effect in the X-axis direction.

Figure 6:
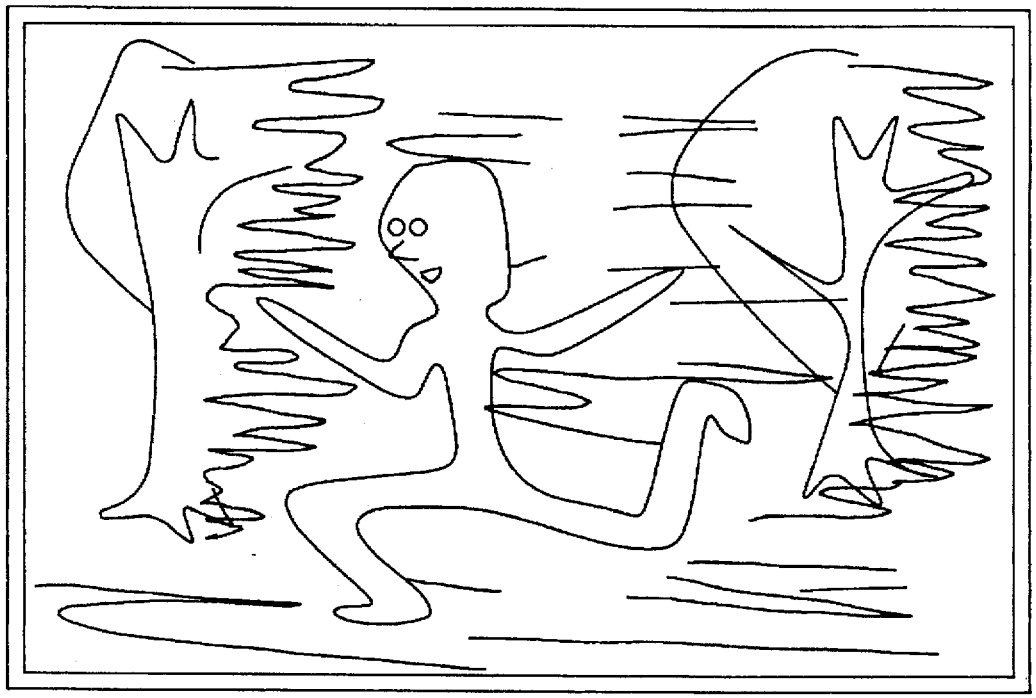
FIG. 6 is an example of a photograph taken with the motion compensation device in accordance with embodiments of the present invention.

FIG. 6 shows an example of a photograph taken during which panning was conducted in the horizontal direction, relative to the optical axis and motion compensation was conducted only for the Y-axis. The main subject is immobilized and the background is blurred with the panning effect.

It will be recognized that the present invention is not limited to the embodiments described above, and various modifications or changes are possible within the scope of the invention. For example, in the embodiments described above the direction of the motion compensation control axis was described for the case of two axes in the X direction and the Y direction. However, the present invention is applicable to a motion compensation device having more than two control axes. For example, the present invention is applicable to the case of three control axes, with each axis 60 degrees apart. In addition, in the embodiments described above, the lens device described is for a single-lens reflex camera in which the lens device can be removed from the body device. However, the present invention is applicable to a lens shutter camera having a lens that is not interchangeable.

In accordance with the embodiments of the present invention, it is possible to conduct motion compensation control in different control axis directions individually relative to the optical axis of the photographic system. Therefore, it is possible to achieve a blur effect by conducting motion compensation control in a non-panned direction while not performing motion compensation control in the direction of the pan.

In accordance with embodiments of the present invention, it is easy to select a direction of the motion compensation control because the control axis for which motion compensation control is conducted is selected by a control axis selection unit.

Further, because the direction of the control axis and the selection switch that selects the control axis are identical, the selected direction for the motion compensation control can be easily recognized, regardless of whether the photographic device is held vertically or horizontally.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A motion compensation device, comprising:
    a motion compensation optical system;
    a motion detection device to detect motion;
    a motion compensation drive device having plural drive units to shift the motion compensation optical system in respective plural directions to compensate for the detected motion;
    a control selection unit, including a selection switch which is settable in plural switch positions, to select a direction from the plural directions in which motion compensation is performed according to the switch position;
    a motion compensation control unit to select one of the plural drive units to perform motion compensation control according to the direction selected by the selection switch and to control the selected one of the plural drive units to shift the motion compensation optical system using only the selected drive unit.

2. A motion compensation device as recited in claim 1, wherein the optical system has an optical axis and the respective plural drive units drive the motion compensation optical system in respective directions with respect to the optical axis to compensate for the detected motion.

3. A motion compensation device as recited in claim 2, wherein the a control selection unit provides information regarding the selected direction to the motion compensation control unit such that the motion compensation control unit controls one of the plural drive units to shift the motion compensation optical system in the selected direction.

4. A motion compensation device as recited in claim 3, wherein the plural switch positions of the control axis selection switch correspond to the respective plural axis directions.

5. A motion compensation device as recited in claim 3, wherein the plural drive units include an X-axis drive unit to shift the motion compensation optical system in an X-axis direction with respect to the optical axis and a Y-axis drive unit to shift the motion compensation optical system in a Y-axis direction with respect to the optical axis, and the control axis selection unit selects one of the X-axis drive unit and the Y-axis drive unit to shift the motion compensation optical system in the axis direction selected by the control axis selection unit.

6. A motion compensation device as recited in claim 5, wherein the selection switch is set in a horizontal position when the X-axis motion compensation control is selected and is set in a vertical position when the Y-axis motion compensation control is selected.

7. A camera having a motion compensation device to compensate for movement of an optical axis of a photographic optical system causing blurring of an image projected onto an image plane by the photographic optical system, comprising:
    a motion compensation optical system;
    a motion detection device to detect motion causing movement of the optical axis of the photographic optical system;
    a motion compensation drive device including plural drive units to shift the motion compensation optical system in respective plural axis directions in a plane perpendicular to the optical axis to compensate for the detected motion;
    a control axis selection unit including a selection switch settable in plural switch positions to select one of the plural axis directions in which motion compensation control is to be performed according to the switch position, and to select a drive unit to drive the motion compensation optical system in the selected axis direction; and
    a motion compensation control unit to control the drive unit selected by the control axis selection unit to shift the motion compensation optical system to compensate for motion in the selected axis direction.

8. A camera as recited in claim 7, wherein the plural drive units include an X-axis drive unit to shift the motion compensation optical system in an X-axis direction in a plane perpendicular to the optical axis and a Y-axis drive unit to shift the motion compensation optical system in a Y-axis direction in a plane perpendicular to the optical axis, and the control axis selection unit selects one of the X-axis drive unit, the Y-axis drive unit and both the X-axis and Y-axis drive units to shift the motion compensation optical system.

9. A camera as recited in claim 8, wherein the plural switch positions of the control axis selection switch correspond to the plural axis directions.

10. A camera as recited in claim 9, wherein the control axis selection switch is set in a horizontal position when the X-axis drive unit is selected, is set in a vertical position when the Y-axis drive unit is selected and is set at a 45 degree angle when both the X-axis and Y-axis drive units are selected.

* * * * *